(12) United States Patent
Hintzer et al.

(10) Patent No.: US 6,703,068 B2
(45) Date of Patent: Mar. 9, 2004

(54) AMINE OXIDE COATING COMPOSITIONS

(75) Inventors: Klaus Hintzer, Kastl (DE); Armin Steurer, Tittmoning (DE); Dieter Birkhorst, Altötting (DE); James Michael Larson, Saint Paul, MN (US); Joseph William Frisk, Oakdale, MN (US); Wayne Meredith Boand, Lino Lakes, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 76 days.

(21) Appl. No.: 10/027,608

(22) Filed: Dec. 19, 2001

(65) Prior Publication Data

US 2003/0114576 A1 Jun. 19, 2003

(51) Int. Cl.$^7$ ................................. B05D 5/12
(52) U.S. Cl. ................... 427/115; 427/180; 427/372.2; 427/205
(58) Field of Search ............................ 427/115, 372.2, 427/180, 205; 429/40, 1, 44

(56) References Cited

U.S. PATENT DOCUMENTS

| 4,670,363 A | * | 6/1987 | Whitney et al. | ............ 429/327 |
| 6,127,059 A | * | 10/2000 | Kato | ............ 429/40 |
| 6,280,871 B1 | * | 8/2001 | Tosco et al. | ............ 429/41 |
| 6,465,041 B1 | * | 10/2002 | Frisk et al. | ............ 427/228 |
| 6,524,736 B1 | * | 2/2003 | Sompalli et al. | ............ 429/42 |

FOREIGN PATENT DOCUMENTS

JP   44985   * 2/1994

* cited by examiner

Primary Examiner—Brian K. Talbot
(74) Attorney, Agent, or Firm—Philip Y. Dahl

(57) ABSTRACT

An aqueous coating composition is provided comprising carbon particles, one or more highly fluorinated polymers and one or more amine oxide surfactants, typically an amine oxide surfactant according to formula I:

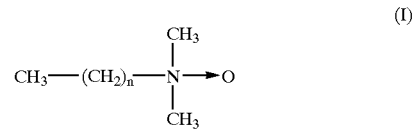

where n is 9 to 19. The coating composition is advantageously used in a method of making a gas diffusion layer for an electrochemical cell comprising the steps of: a) coating a electrically conductive porous substrate with the aqueous coating composition, and b) heating the electrically conductive porous substrate to a temperature sufficient to decompose the amine oxide surfactants. In another aspect, a gas diffusion layer for an electrochemical cell is provided which is advantageously free of surfactant.

5 Claims, No Drawings

AMINE OXIDE COATING COMPOSITIONS

This invention was made with Government support under Cooperative Agreement DE-FC02-99EE50582 awarded by DOE. The Government has certain rights in this invention.

FIELD OF THE INVENTION

This invention relates to an aqueous coating composition useful for making a gas diffusion layer for an electrochemical cell such as a fuel cell, which layer is advantageously free of surfactant residue. The coating composition comprises carbon particles, one or more highly fluorinated polymers, and one or more amine oxide surfactants.

BACKGROUND OF THE INVENTION

U.S. Pat. No. 6,127,059 describes the use of Triton™ X100, an alcohol alkoxylate, as a surfactant when coating a gas diffusion layer for use in an electrochemical cell with a fluororesin containing carbon black.

SUMMARY OF THE INVENTION

Briefly, the present invention provides an aqueous coating composition comprising carbon particles, one or more highly fluorinated polymers and one or more amine oxide surfactants, typically an amine oxide surfactant according to formula I:

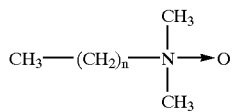

(I)

where n is 9 to 19.

In another aspect, the present invention provides a method of making a gas diffusion layer for an electrochemical cell comprising the steps of: a) coating a electrically conductive porous substrate with the aqueous coating composition according to the present invention, and b) heating the electrically conductive porous substrate to a temperature sufficient to decompose the amine oxide surfactants.

In another aspect, the present invention provides a gas diffusion layer for an electrochemical cell made according to the method of the present invention which typically contains no surfactant.

What has not been described in the art, and is provided by the present invention, is a coating composition and method of using same which contains a decomposing amine oxide surfactant and can therefore provide a surfactant-free gas diffusion layer.

In this application:

"vehicle" means a fluid which carries the particulate in a dispersion, which typically includes water or an alcohol;

"highly fluorinated" means containing fluorine in an amount of 40 wt % or more, but typically 50 wt % or more, and more typically 60 wt % or more; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

It is an advantage of the present invention to provide a coating composition and method of using same which contains an effective surfactant which is ephemeral in use, and therefore capable of providing a surfactant-free gas diffusion layer.

DETAILED DESCRIPTION OF PREFERRED EMBODIMENTS

The present invention provides an aqueous coating composition comprising carbon particles, one or more highly fluorinated polymers and one or more amine oxide surfactants.

Fuel cells are electrochemical cells which produce usable electricity by the catalyzed combination of a fuel such as hydrogen and an oxidant such as oxygen. Typical fuel cells contain layers known as gas diffusion layers or diffuser/current collector layers adjacent to catalytically reactive sites. These layers must be electrically conductive yet must be able to allow the passage of reactant and product fluids. Typical gas diffusion layers are coated with a layer of carbon particles and fluoropolymers on the surface adjacent to the catalyst.

The coating composition may employ any suitable aqueous vehicle. The vehicle comprises water and may additionally comprise alcohols, and more typically comprises only water or alcohols. Most typically the vehicle comprises water alone.

Any suitable amine oxide surfactants may be used. Suitable amine oxides may belong to formula II: $R_3N \rightarrow O$, where each R is independently selected from alkyl groups containing 1–20 carbons, which optionally include ether and alcohol groups, and which may be additionally substituted. Typically the amine oxide surfactant is an Us amine oxide according to formula I:

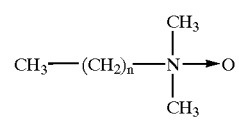

(I)

where n is 9 to 19 or more typically 11–15. Most typically, n is 11 or 13. The amine oxide according to formula I is optionally substituted. Suitable amine oxide surfactants may include those available under the trade names Genaminox®, Admox®, Ammonyx®, and Ninox®. The amine oxide surfactant advantageously has a decomposition temperature of less than 200° C., more typically less than 180° C. and most typically less than 160° C. The aqueous coating composition typically comprises 0.1–15% amine oxide surfactant by weight, more typically 0.1–10% by weight, and most typically 1–5% by weight.

Any suitable carbon particles may be used. It will be understood that the term "carbon particles" as used herein can refer to primary particles, typically having a average size of 1–100 nm, primary aggregates of primary particles, typically having an average size of 0.01–1 microns, secondary aggregates of primary aggregates, typically having an average size of 0.1–10 microns, and agglomerates of aggregates, typically having an average size of greater than 10 micron. Most typically, the term "carbon particles" refers to primary particles or primary aggregates. Typically a carbon black is used, such as Vulcan XC-72 (Cabot Corp., Special Blacks Division, Billerica, Mass.), Shawinigan Black, grade C55, (Chevron Phillips Chemical Company, LP, Acetylene Black Unit, Baytown, Tex.) or Ketjenblack EC300J (Akzo Nobel Chemicals Inc., Chicago, Ill.). Graphite particles may also be used, but typically have larger particle sizes. The aqueous coating composition typically comprises 1–50% carbon particles by weight, more typically 1 . 20% by weight, and most typically 5–15% by weight. Typically, the aqueous coating composition comprises lower weight percent content of carbon particles where smaller particles are used. The highest weight percent content of carbon particles are achieved with the addition of graphite particles, which typically have larger particle sizes.

Any suitable highly fluorinated polymers may be used. The highly fluorinated polymer is typically a perfluorinated polymer, such as polytetrafluoroethylene (PTFE), fluorinated ethylene propylene (FEP), perfluoroalkyl acrylates, hexafluoropropylene copolymers, tetrafluoroethylene/hexafluoropropylene/vinylidene fluoride terpolymers, and the like. The aqueous coating composition typically comprises 0.1–15% highly fluorinated polymers by weight, more typically 0.1–10% by weight, and most typically 1–5% by weight.

In the method according to the present invention, a gas diffusion layer for an electrochemical cell is made by the steps of: a) coating a electrically conductive porous substrate with the aqueous coating composition described above, and b) heating the electrically conductive porous substrate to a temperature sufficient to decompose the amine oxide surfactants.

Any suitable electrically conductive porous substrate may be used. Typically, the electrically conductive porous substrate is a carbon fiber construction. Typically carbon fiber constructions are selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The porous substrate may be treated prior to coating. Typical treatments include those that increase or impart hydrophobic properties, such as treatment with fluoropolymers such as PTFE. Other typical treatments may increase or impart hydrophilic properties.

Any suitable method of coating may be used. Typical methods include both hand and machine methods, including hand brushing, notch bar coating, wire-wound rod coating, fluid bearing coating, slot-fed knife coating, and three-roll coating. Coating may be achieved in one pass or in multiple passes.

The heating step may be accomplished by any suitable method. Advantageously, the temperature and duration of the heating step is sufficient to decompose all of the surfactant. Advantageously, the temperature and duration of the heating step is sufficient to decompose and remove all of the surfactant and decomposition products of the surfactant. In addition, the temperature and duration of the heating step is advantageously sufficient to sinter the fluoropolymer. In one embodiment, the decomposition temperature is at least 5° C. less than the sintering temperature of the highly fluorinated polymers. In this way, the surfactant can be substantially removed before sintering of the fluoropolymers on the substrate. More typically, the decomposition temperature is at least 10° C. less than the sintering temperature. Most typically, the decomposition temperature is at least 20° C. less than the sintering temperature.

The present invention advantageously provides a gas diffusion layer for an electrochemical cell which contains substantially no surfactant. Typically, the a gas diffusion layer according to the present invention contains substantially no surfactant or surfactant decomposition products.

The resulting gas diffusion layer is typically incorporated into a membrane electrode assembly for use in an electrochemical cell such as a hydrogen fuel cell by any suitable method, many of which are known in the art.

This invention is useful in the manufacture of a gas diffusion layer for use in electrochemical cells such as hydrogen fuel cells.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a gas diffusion layer for an electrochemical cell comprising the steps of:
   a) coating a electrically conductive porous substrate with an aqueous coating composition comprising carbon particles, one or more highly fluorinated polymers and one or more amine oxide surfactants; and
   b) heating the electrically conductive porous substrate to a temperature sufficient to decompose said amine oxide surfactants.

2. The method according to claim 1 wherein said electrically conductive porous substrate comprises carbon fiber.

3. The method according to claim 1 wherein said highly fluorinated polymers have a sintering temperature and wherein said amine oxide surfactants have a decomposition temperature which is lower than said sintering temperature by at least 5° C.

4. The method according to claim 3 wherein said step of heating the electrically conductive porous substrate comprises heating the electrically conductive porous substrate to a temperature sufficient to sinter said highly fluorinated polymers.

5. The method according to claim 3 wherein said step of heating the electrically conductive porous substrate comprises heating the electrically conductive porous substrate to a temperature sufficient to sinter said highly fluorinated polymers.

* * * * *

UNITED STATES PATENT AND TRADEMARK OFFICE
CERTIFICATE OF CORRECTION

PATENT NO. : 6,703,068 B2
DATED : March 9, 2004
INVENTOR(S) : Klaus Hintzer

It is certified that error appears in the above-identified patent and that said Letters Patent is hereby corrected as shown below:

Column 2,
Line 31, "an Us amine" should read -- an amine --

Column 4,
Line 44, "claim 3" should read -- claim 1 --

Signed and Sealed this

Twenty-second Day of June, 2004

JON W. DUDAS
*Acting Director of the United States Patent and Trademark Office*